Patented Mar. 12, 1946

2,396,524

UNITED STATES PATENT OFFICE 2,396,524

COMBUSTION ENGINE AND PROCESS

Friedrich Nettel, New York, N. Y.

Application January 5, 1940, Serial No. 312,473

11 Claims. (Cl. 123—23)

This invention relates to internal combustion engines involving suitable methods for efficient use of solid hydrocarbons as fuels.

The main object of my invention is to simplify the use of solid hydrocarbons and to efficiently use them for engines of the spark-ignition or compression-ignition type.

Another object is to feed these fuels in finely pulverized form and to heat the fine fuel particles while suspended in carrier gas or air to temperatures sufficient for melting and/or vaporizing them prior to their entrance into the engine cylinder or actually within the engine cylinder.

A further object is to use solid fuel simultaneously with other fuels which are in liquid form, avoiding mixing of different liquid fuels.

In order to facilitate a ready comprehension of the invention herein and its particular features, drawings are attached hereto by which non-limiting examples are shown as follows.

Figure 1:
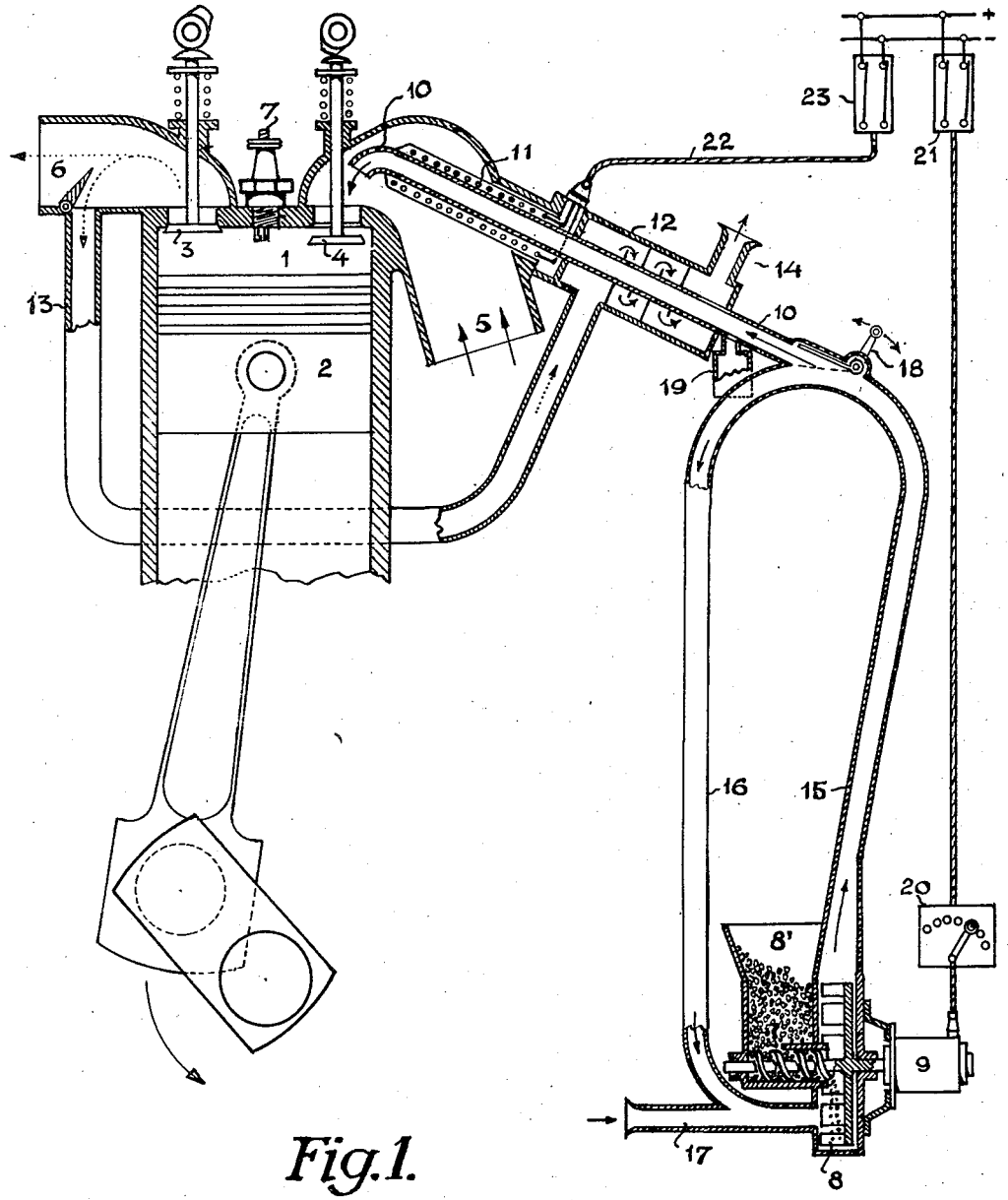
Figure 1 is a layout of a 4-cycle internal combustion engine for carrying out the invention in practical form using spark-ignition and forming the combustible mixture outside the cylinder proper.

At present, liquid fuels dominate the field as fuels for internal combustion engines of any kind and for most purposes for stationary plants and vehicles. This is explained by the well known advantages of such fuels such as high calorific value of fuel referred to weight or volume unit; easy transport, storage and distribution; high economic efficiency, low engine weight per H. P. and easy handling and maintenance.

This has led to an enormous demand for liquid fuels and even efforts to liquefy solid fuels such as coal. Dependence on liquid fuels only is not desirable for many reasons, especially in countries lacking natural sources of liquid fuels.

Besides, the fire and explosion hazards involved in the use of highly volatile fuels such as gasoline are most undesirable for many purposes.

Up to the present, efforts to use solid fuels were practically restricted to coal dust of low ash content and only for experimental purposes other fuels such as ground coffee, rice hulls, waste flour, saw dust, etc., were occasionally used. So far, only a few experimental engines are under test as coal dust engines working on the compression-ignition cycle.

The basic obstacle to the use of all above mentioned solid fuels lies in their considerable ash content, which causes inadmissible wear on valves, cylinders and piston rings.

All efforts to use these fuels in spark-ignition engines have failed so far because the solid particles settled partly on the cylinder walls, there forming together with the lubrication oil a grinding paste which made continuous operation impossible.

It is known in the art to have engines using solid fuel which is transported in pulverized form suspended in carrier-air, and in order to ensure regular and easily adjustable supply, to let this fuel air mixture circulate in a closed circuit from which one or several pipes are branched off to the engine cylinder or cylinders.

It is also known to preheat coal dust on the way from the pulverizer to an intermediate bunker to a temperature only a little lower than the ignition point of the coal dust, to assure better ignition when the coal is blown into the engine cylinder. In practice, this system failed with coal powder, because the coal gas of lowest volatility, which is the most valuable in initiating combustion, escaped and formed a highly explosive gas mixture above the fuel in the intermediate dust bunker; besides, coking occurred which made injection difficult.

Under certain conditions, however, other factors such as non-explosibility on impact, reduced sensitiveness of fuel tanks against damage, safety of operation under extraordinary atmospheric conditions (extremely low or high air temperatures), procurability from other available raw materials than oil such as coal, coke, natural or artificial gases, may make the use of certain solid fuels other than coal very advantageous.

Certain liquid fuels are of sufficiently low viscosity at normal temperatures; however, not so at low air temperatures, which creates difficulties in vaporizing or injecting these fuels.

Other kinds of fuels again, solid at normal temperatures, melt when heated and vaporize when heated further, practically without residue.

The engine according to the invention, makes it possible and practical to efficiently feed and burn fuels of these latter two classes, while simultaneously securing the above mentioned advantages.

This problem is solved by the invention by using as fuels solid hydrocarbons (including such as contain oxygen) which melt within the range of −30 deg. C. and +150 deg. C. and evaporate when heated above the respective melting point practically without residue, introducing such fuels in pulverized form mixed with a sufficient amount of carrier-air, in the manner conventionally known for other solid fuels, during the air charging and/or the compression period of the engine.

Contrary to such pulverized fuels as were used up to the present, the hydrocarbons as specified above, melt already partly when exposed to the radiation from the warm cylinder walls, before actually touching them and evaporate during the air charging and/or the following compression stroke, forming an easily ignitible mixture with the combustion air.

For fuels melting above the temperature of the ambient air, and/or to facilitate starting of the engine, according to the invention, part of the feeding pipe for the fuel-carrier air mixture is kept at a temperature above the melting point of the respective fuel.

Non-limiting examples of fuels according to the invention are: naphthalene, ceresin, paraffin and other waxes, anthracen, cresol, carbolic acid, benzol.

The part of the feeding pipe for the fuel-carrier air mixture which, as mentioned above, is heated according to the invention, may also be heated by the exhaust gases. For starting and if only temporarily used, any other heat source (electric heater, auxiliary burner, etc.,) may be utilized.

Since only the carrier air is heated prior to entry into the engine cylinder, but not the bulk of the combustion air, no appreciable loss of output is caused.

In the heated part of the fuel feeding pipe some part of the fuel may be molten but not vaporized. To handle such unvaporized fuel as may be dropped from the carrier air in the feed pipe, means are provided according to the invention to enable this fuel to flow into a chamber from which it can be recovered for re-use. The intensity of the heating may be regulated by hand or automatically to ensure best possible conditions for fuel evaporation and mixture formation within the cylinder under all possible working conditions.

Speed regulation can be effected by the usual throttle method and/or by varying the pressure of the carrier air. In the latter case the fuel is introduced also during part of the compression stroke and the fuel intake is terminated by the rising compression pressure, i. e., when this pressure becomes equal to the pressure of the carrier air. By increasing or decreasing the latter, the fuel intake period is prolonged or shortened respectively.

There are certain further liquid fuels available which by themselves are not conveniently used (alcohols, aldehydes, ketones, etc.) and for which carbureting with other fuels such as benzol, naphthalene etc. is desired. This was difficult up to the present because alcohols, for instance, form a stable mixture with other fuels only when practically free of water content. Naphthalene and other suitable carbureting fuels are insoluble or badly soluble in alcohols at normal temperatures.

According to the invention the simultaneous utilization of alcohols with or without water content, and of other carburating fuels is effected, avoiding the mixing of the 2 fuels in the liquid state altogether, by introducing the carburant, for example, naphthalene, benzol etc., in pulverized form as described above, while the alcohol is injected into the pulverized fuel-carrier air mixture just before, in, or beyond the heated part of the fuel feeding pipe. It is, of course, also possible to introduce the alcohol or other fuel to be carbureted separately into the cylinder by means of an ordinary carburetter or any other injection device. Especially valuable is the possibility according to the invention of starting the engine only with the solid or solidified fuel and further to meet load changes by varying the ratio of solid to liquid fuel by hand or by automatic regulation during the running of the engine.

For certain purposes when it may be desired to work without an ignition device, the invention makes it possible and practical to use fuels as specified above with the compression-ignition cycle. Only with such fuels as specified by the invention, is the classical pulverized fuel compression-ignition engine possible without auxiliary combustion chambers. Since practically no ash remains, all difficulties disappear. It is, however, also possible to use auxiliary combustion chambers in which the fuel is melted and vaporized by heat conduction from the warm engine, and/or by the heat of compression. For starting an auxiliary heat source may be employed.

The compression-ignition operation can also be obtained by the invention for fuels as specified in a similar way as practiced for gas operation, the solid fuel being introduced during the suction and/or compression stroke, as described above, in pulverized form with carrier air while ignition is effected by the injection of a small quantity of suitable fuel oil near the upper dead center. This new method makes it possible to use standard Diesel engines, which for this purpose are equipped with a simple auxiliary device for introducing the pulverized fuel as described above. Starting is effected with fuel oil only.

Hence, in the practice of my invention, the first example of a practical embodiment is shown in Figure 1 wherein the cylinder 1 of the engine has a reciprocable piston 2, the cylinder being provided with the exhaust valve 3 and the intake valve 4 operated by cams or in any other known manner, the air suction pipe 5 leading to the intake valve while the exhaust pipe 6 conducts the exhaust gases away from exhaust valve 3 and in a convenient position in the cylinder is fixed the spark plug 7. As a portion of the present system of the present invention, the fuel pulverizer mill 8 is preferably of the beater wheel type provided with a fuel tank or hopper 8' for solid fuel, and is driven by a motor 9 or any other convenient prime mover. Leading from the mill is a charging pipe 10 for the pulverizer fuel which is propelled through said pipe in the direction of the arrows upwardly into the interior of intake pipe 5, the rotation of the beater wheel of the mill causing air or any gas entering through inlet pipe 17 to rise through pipe 15 and serve as carrier air or gas for the pulverized fuel.

Surrounding the pipe 10 near its upper end is an electric heating coil 11 preferably embedded in the heat insulating material and connected by cable 22 through switch means 23 to supply current to coil 11. About another portion of the same pipe 10 is mounted a heating jacket 12 connected through a pipe 13 to the exhaust pipe 6 from which it branches off in a position allowing hot exhaust gases which thus pass through said pipe into the jacket 12 and heat pipe 10 during operation of the apparatus, the gases escaping from the jacket through a pipe 14. The discharge pipe 15 for the fuel air mixture emanating from the pulverizer is connected to a return pipe 16 as well as to the delivery pipe 10, the return pipe being connected to the air intake pipe 17 which feeds air from the atmosphere to the beater wheel so that during operation a continuous circulation of air-borne pulverized fuel is maintained which may be controlled by a flap valve 18 which serves for disconnecting the circuit of pipes 15, 16 and 17 from pipe 10, or for allowing the air with the fuel carried thereby to rise from said circuit into the delivery pipe.

The motor 9 is connected through a speed regulator 20 or the like and switch means 21 to the electric mains and when it is desired to start the engine, closing of the switch means 21 will, of course, start motor 9 operating beater wheel 8 of the mill so that carrier air with pulverized fuel begins to circulate in the closed circuit 15, 16, 17 as indicated by the arrows, and then switch means 23 are also closed in order to energize the heat coil 11 and thereby heat pipe 10. Up to this moment the flap valve 18 has been maintained closed but as soon as the pipe 10 is heated by coil 11, this flap valve is gradually opened, the spark plug 7 is switched in to a current source and timed by means not shown and the motor turned. Pulverized fuel now begins to flow to the cylinder and the engine starts and presently the exhaust gases flowing to the jacket heater 12 gradually take over the heating of pipe 10 so that the electric heater 11 may be disconnected. Of course, when the exhaust may not suffice to heat pipe 10 to the temperature desired at low loads, the electric heater may also be used simultaneously with the exhaust heater 12 depending upon the nature of the solid fuel which is used. In any case, it is intended that the heating of the pulverized fuel passing upward through the delivery pipe shall be sufficient to melt the pulverulent particles of the fuel so that the same tend to vaporize in the air carrying them as the air issues from pipe 10 into intake pipe 5 and is mixed with further air and drawn into the cylinder through intake valve 4. Any of the solid fuel which is not vaporized but tends to run back by gravity into pipe 10 will be caught in the collecting tank 19 so as to avoid any molten fuel from running down from pipe 10 into pipe 15.

Figure 2:
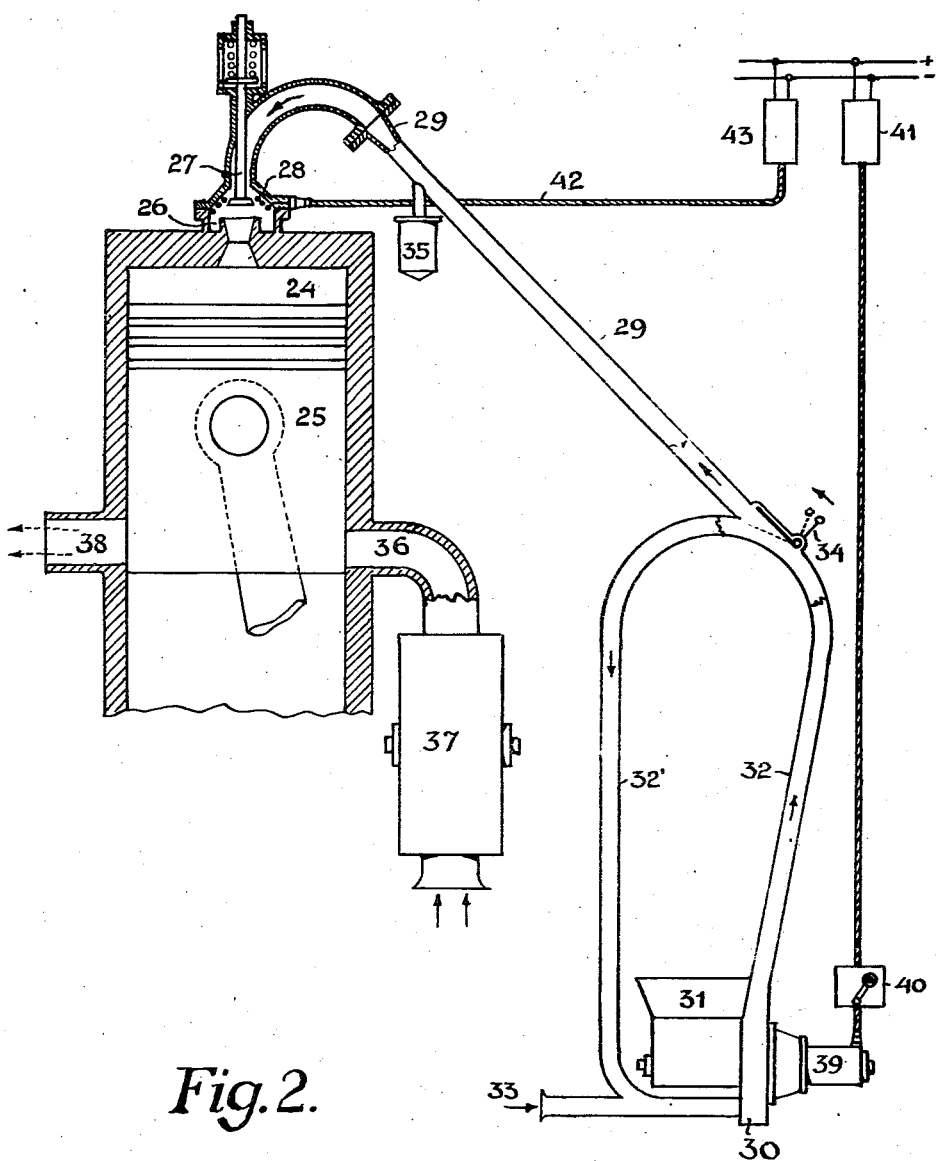
Figure 2 is a layout of a 2-cycle engine of the compression-ignition type with pre-combustion chamber into which the mixture of pulverized fuel-carrier air is charged.

Figure 2 illustrates a 2-cycle compression-ignition engine in which the cylinder 24 has a piston 25 and a pre-combustion chamber 26 provided with a non-return valve 27 normally kept open by a spring while a heating coil 28 is located in the pre-combustion chamber for heating the interior thereof and thus melting and vaporizing the fuel prior to ignition as it enters the pre-combustion chamber from the delivery pipe 29 derived from pulverizer mill 30 having the hopper or container 31 for the fuel and delivering the pulverized fuel with carrier air through pipe 32 either to delivery pipe 29 or to return through pipe 32' and then returning the fuel and air to pipe 33 which draws in additional air from the atmosphere. The closed circuit and its connection to delivery pipe 29 is, of course, controlled as previously described by a flap valve 34, while a collecting tank 35 is connected to pipe 29 to catch any returned molten fuel which might run down pipe 29. The one portion of the cylinder 25 is connected to air intake pipe 36 provided with a charging and scavenging air pump 37 while an exhaust pipe 38 is also connected to the cylinder to dispose of the burned gases. A motor 39 is controlled by the speed regulator 40 and started or stopped by the switch means 41 connecting said motor to the mains while a cable 42 connects the heating coil 28 of the pre-combustion chamber to the mains through switch means 43.

In order to start the engine, the motor 39 is started so that the mill begins to pulverize fuel and circulate the same through the closed circuit of pipe 32 and 32' while the flap valve 34 is closed and blocks entry of any fuel to pipe 29. Then heater 28 is switched in whereupon the engine is turned and air pump 37 operated and then flap valve 34 gradually opened. When sufficient fuel reaches the pre-combustion chamber and is heated by the coil 28, the first ignition will occur. During the compression and working stroke, the valve 27 is kept closed by the pressure prevailing in the cylinder and pre-combustion chamber. By adjusting the stroke and the position of the flap valve 34, or by changing the speed of the mill motor, regulation of the speed of the engine is readily effected.

Figure 3:
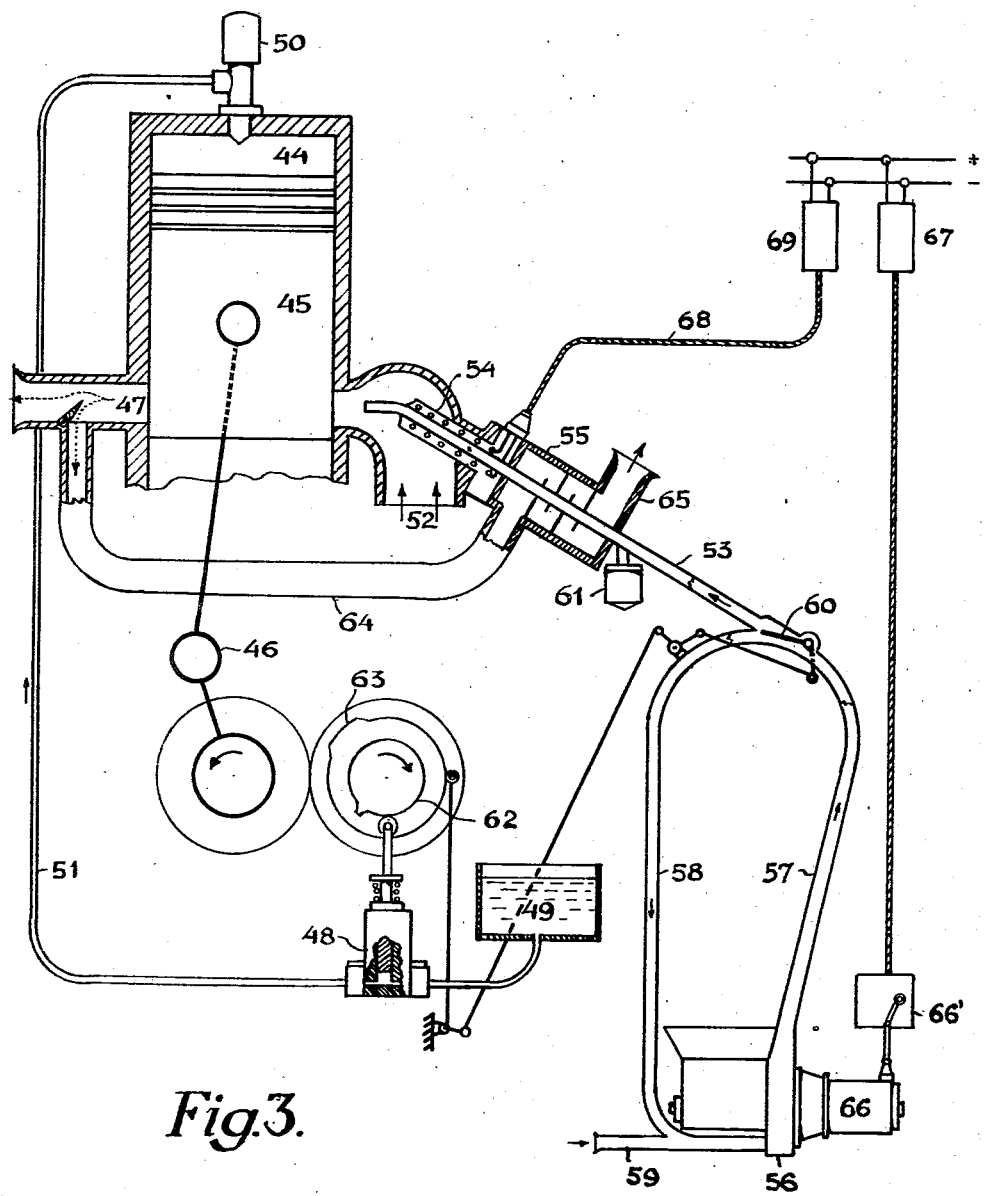
Figure 3 is a layout of a two-cycle engine in practical form using compression-ignition forming a combustible mixture of air and solid or solidified carbohydrate during the suction and/or compression stroke and igniting the mixture by injecting liquid fuel.

Figure 3 illustrates an adaptation of an ordinary compression-ignition engine for burning solid fuels according to the principles of my invention, and has a cylinder 44 containing the piston 45 driving the crank 46 by the usual crank rod, the cylinder having the exhaust pipe 47 and the intake pipe 53 heated as first described by an electric heating coil 54 and/or the exhaust gas heating jacket 55 for heating the delivery pipe 53 connected to the mill 56 through a pipe 57 past control valve 60 which is operable to connect delivery pipe 53 into the circuit consisting of the pipe 57, return pipe 58 and air intake pipe 59. A motor 66 is controlled by speed regulator 66' operating mill 56 as before, while switch means, 67 control the connections of the motor to the mains and a cable 68 connects the heating coil 54 through switch means 69 to the same mains. The cylinder, piston, crank rod and shaft, exhaust gas discharge 47, the mill 56 and its circuit 57, 58, 59, control valve 60, delivery air intake pipe 52, pipe 53, heater 55 with its outlet 65 and heater coil 54, etc. are all similar to the analogous structures previously described, but in this form of engine additional means are included for using liquid fuel as well as the solid fuel. In the liquid fuel supply portion of the system is a fuel pump 48 passing fuel from the tank 49 to the injector nozzle 50 through pipe 51 while the cam 62 operated by the engine operates the pump and the cam 63 operates the flap valve through intermediate bell crank levers and links diagrammatically indicated in the drawings.

In this engine the main portion of the fuel is, of course, the solid pulverized fuel supplied from the mill 56 through delivery pipe 53 into air intake pipe 52 at the point where the latter connects directly with the interior of the cylinder 44 while a small portion of the fuel used is the liquid fuel from tank 49 and serves to prime and definitely time the actual ignition by being injected at the proper moment into the cylinder through injector nozzle 50. Injection of liquid fuel is accomplished at the end of compression by operating pump 48 by means of the cam 62, while the flap valve 60 as already mentioned, is operated by cam 63, so as to admit fuel with carrier air into pipe 53 from the end of the scavenging period to the end of the charging period, that is, until the intake ports are closed. Starting is accomplished with liquid fuel alone in conventional manner and then heater 54 is switched in to heat delivery pipe 53 and the flap valve 60 is put into operation when the pulverized fuel takes over the load and the fuel pump 48 is adjusted to supply just a sufficient amount of liquid fuel to effect reliable ignition at the proper moment for each combustion.

Figure 4:
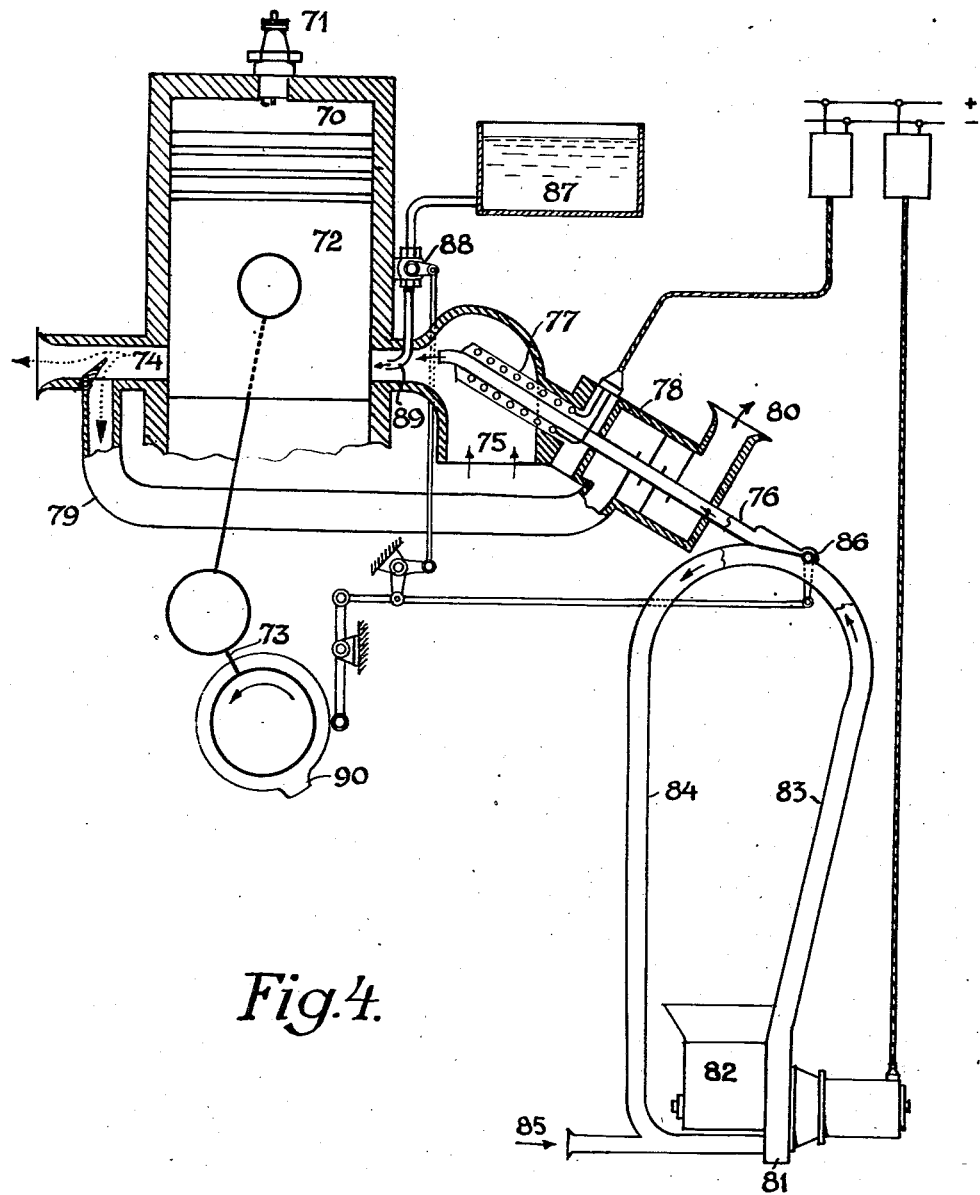
Figure 4 is a layout of a two-cycle engine in practical form using spark-ignition forming the combustible mixture of air and two different fuels, one pulverized and the other liquid, outside the engine cylinder proper.

In Figure 4 is shown a 2-cycle spark-ignition engine which, in principle, operates in the same manner as the engine of Figure 1, the cylinder 70 having the conventional spark plug 71, the piston 72, the crank arm 73 and exhaust pipe 74 and the air inlet pipe 75 into which the fuel and carrier air mixture is introduced by delivery pipe 76 surrounded at one portion by the electric heater 77, and at another portion by the exhaust gas heater jacket 78 fed by branch pipe 79 connected to exhaust pipe 74, while the discharge pipe 80 allows the exhaust gas to escape to the atmosphere from the heater 78. A pulverizer mill 81 with a fuel tank 82 for the solid fuel delivers pulverized fuel with carrier air into the circuit 83, 84, 85 in the manner previously described, while the flap valve 86, controlled by the cam 90 of the engine, directly controls the supply of the air fuel mixture to the air intake pipe 75 through the delivery pipe 76.

The main new feature in this form of invention includes the fuel tank 87 for liquid fuel which may be ordinary commercial alcohol, for example, which is conducted via valve 88 to an atomizer nozzle 89 disposed within the intake pipe 75. The valve 88 is coupled to the flap valve 86 by proper links and levers as diagrammatically shown and both controlled by the cam 90. Starting is effected by first starting the electric heater 77, mill 81 is then switched in and the engine turned. The engine may start on the pulverized fuel alone and the valve 88 thereafter put into operation when any desired part of the load may be taken over by the liquid fuel which, in the present instance, may be ordinary alcohol. Inasmuch as flap valve 86 and the liquid fuel valve 88 are preferably coupled and operated by the common lever arrangement, both valves are intended to be closed during the exhaust and scavenging period.

At the air intake 75, a scavenging air pump may be connected, if desired, but this is not shown in the present drawings. However, the present form of invention in Figure 4 is also particularly suited to operate according to the 2-cycle method without a scavenging pump as per the known Kadenacy method. In that case, the first working air charge may be supplied by the beater wheel of the pulverizer mill 81 operating as a fan while the flow of solid fuel from the container or hopper 82 to the mill is temporarily interrupted, after which the flap valve 86 is opened so as to allow fuel with carrier air to enter the engine cylinder and cause the first explosion while the engine is turned. Once the engine has started, further scavenging and charging takes place by the suction of the exhaust gases, causing a lowering of pressure in the cylinder for a short period sufficient for effective scavenging and charging.

From the foregoing, it is clear that the present engine applies the experience gained in preparing and firing pulverized fuel such as coal, etc. for solving the problem of feeding solid hydrocarbons in a perfectly practical manner to internal combustion engines. It is also clear that by the present invention, the hot passage is introduced into the art, or the idea of exposing the suspended particles of solid fuel to the heat radiation from cylinder walls and other engine parts and to the heat of compression, so as to utilize the idea of vaporization in suspension in a new field with surprisingly efficient results.

It should be added that some solid fuels which are now made available by the present invention for wide use, will greatly relieve the fuel situation, not to mentioned that the fire hazard is practically eliminated when the solid fuel alone is used, and when this is considered in connection with the very attractive feature that some solid fuels have practically as great calorific value as gasoline when compared by weight; safety in air transport and other heretofore hazardous means of travel and operation are now also well within the purview of the invention and its advantages. A notable solid fuel is, of course, naphthalene, because it is cheap and due to its being a double aromatic hydrocarbon, it is of the type of fuel known as the anti-knock class. When the solid fuel is used with liquid fuel, the latter can be common commercial alcohol of the cheapest type in which no expensive steps have been taken to remove the water, because the presence of the water in the alcohol is of no moment when used in the present invention, as the operation always falls back on the solid pulverized fuel as the mainstay or nucleus of such operation.

The word "particulate" as used in the claims, is in the sense defined in Webster's Unabridged Dictionary, namely existing as minute separate particles.

Manifestly, variations other than those specifically set forth may be resorted to and parts may be used without others in the practice of my invention within the scope of the appended claims.

Having now fully described my invention, I claim:

1. An internal combustion power system for utilizing substantially completely vaporizable solid fuel introduced into said system in the solid state, comprising at least one cylinder, a piston reciprocable in said cylinder, means to bring said fuel into particulate state and set up a current of carrier air to transport said fuel in suspension, a conduit for said fuel-laden air operatively connected to the interior of said cylinder, heating means to change said fuel from the solid state while in said carrier air with vaporization of at least a substantial portion of said air-borne fuel, and means to control the flow of fuel in said conduit.

2. An internal combustion power system for utilizing substantially completely vaporizable solid fuel introduced into said system in the solid state, comprising at least one cylinder, a piston reciprocable in said cylinder, means to bring said fuel into particulate state, means to transport said fuel to said cylinder in suspension in a stream of carrier air, heating means to change said fuel from the solid state while in said carrier air with vaporization of at least a substantial portion of said air-borne fuel, and means to control the flow of fuel in said transporting means.

3. An internal combustion power system for utilizing substantially completely vaporizable solid fuel introduced into said system in the solid state, comprising at least one cylinder, a piston reciprocable in said cylinder, means to bring said fuel into particulate state, means to transport said fuel to said cylinder in suspension in a stream of carrier air, heating means to change said fuel from the solid state while in said carrier air, and means to control the flow of fuel in said transporting means.

4. An internal combustion power system for utilizing substantially completely vaporizable solid fuel introduced into said system in the solid state, comprising at least one cylinder, a piston reciprocable in said cylinder, means to bring said fuel into particulate state, means to transport said fuel to said cylinder in suspension in a stream of carrier air, heating means to change said fuel from the solid state while in said carrier air, means to control the flow of fuel in said transporting means, and means to supply to said cylinder additional air for combustion.

5. An internal combustion power system for utilizing substantially completely vaporizable solid fuel introduced into said system in the solid state, comprising at least one cylinder, a piston reciprocable in said cylinder, means to bring said fuel into particulate state and set up a current of carrier air to transport said fuel in suspension, a conduit for said fuel-laden air operatively connected to the interior of said cylinder, heating means to change said fuel from the solid state while in said carrier air with vaporization of at least a substantial portion of said air-borne fuel, means to control the flow of fuel in said circuit and means for simultaneously supplying liquid fuel to said cylinder.

6. An internal combustion power system for utilizing substantially completely vaporizable solid fuel introduced into said system in the solid state, comprising at least one cylinder, a piston reciprocable in said cylinder, means to bring said fuel into particulate state, means to transport said fuel to said cylinder in suspension in a stream of carrier air, heating means to change said fuel from the solid state while in said carrier air, means to control the flow of fuel in said transporting means and means for simultaneously supplying liquid fuel to said cylinder.

7. In a reciprocating internal combustion engine including a cylinder, means for fueling with particulate solid hydrocarbons substantially completely vaporizable, and having melting points between ambient temperatures and +150° C. including means for supplying solid fuel in dispersed state, means for keeping said dispersed fuel in motion, conduit means for transporting said fuel in dispersed state, heating means interposed in said conduit means for liquefying the fuel while in dispersed state, the engine cylinder having an inlet adapted to receive liquefied fuel particles through said conduit means, and means for admitting charges of said liquefied fuel particles from said conduit to the engine cylinder, susbtantially without agglomeration of the liquefied fuel particles into a coalesced body of liquid.

8. In a reciprocating internal combustion engine including a cylinder, means for fueling with particulate solid hydrocarbons substantially completely vaporizable, and having melting points between ambient temperatures and +150° C. including means for supplying a loose mixture of fuel in a stream of carrier air, means for maintaining said mixture in motion, conduit means for transporting said loose mixture, heating means interposed in said conduit means for heating said loose mixture for liquefying the fuel particles dispersed in said carrier air, the engine cylinder having an inlet adapted to receive said heated mixture passing through said conduit, and means for admitting charges of said heated mixture from said conduit means to the engine cylinder substantially without agglomeration of the liquefied fuel particles into a coalesced body of liquid.

9. In a reciprocating internal combustion engine including a cylinder, means for fueling with particulate solid hydrocarbons substantially completely vaporizable, and having melting points between ambient temperatures and +150° C. including means for supplying a loose mixture of particulate full in a stream of carrier air, means for maintaining said mixture in motion, conduit means for transporting said loose mixture, heating means interposed in said conduit means for heating said loose mixture for liquefying and substantially vaporizing the fuel particles in said carrier air, the engine cylinder having an inlet adapted to receive said heated mixture passing through said conduit means, and means for admitting charges of heated mixture from said conduit means to the engine cylinder substantially without agglomeration of the liquefied and substantially vaporized fuel particles into a coalesced body of liquid.

10. In a reciprocating internal combustion engine including a cylinder, means for fueling with particulate solid hydrocarbons substantially completely vaporizable, and having melting points between ambient temperatures and +150° C. including means for supplying a loose mixture of said fuel in a stream of carrier air, blower means for supplying said air stream from the ambient air, conduit means for transporting said loose mixture, heating means interposed in said conduit means for heating said loose mixture for liquefying and substantially vaporizing the individual fuel particles dispersed in said carrier air, the engine cylinder having an inlet adapted to receive said heated mixture passing through said conduit means, and means for admitting charges of heated mixture from said conduit means to the engine cylinder substantially without agglomeration of the liquefied and substantially vaporized particles into a compact body of liquid.

11. In a reciprocating internal combustion engine including a cylinder, means for fueling with particulate solid hydrocarbons substantially completely vaporizable, and having melting points between ambient temperatures and +150° C. including means for supplying said solid fuel in dispersed state, means for keeping said dispersed fuel in motion, conduit means for transporting said fuel in dispersed state, heating means interposed in said conduit means for liquefying and partly vaporizing the fuel while in dispersed state, the engine cylinder having an inlet adapted to receive liquefied and partly vaporized fuel particles passing through said conduit means, means for admitting charges of said liquefied and partly vaporized dispersed fuel from said conduit means to the engine cylinder, and heat insulation means on said conduit means to prevent condensation and agglomeration into a compact body of liquid or solid.

FRIEDRICH NETTEL.